United States Patent
Nagao et al.

(10) Patent No.: US 7,980,347 B2
(45) Date of Patent: Jul. 19, 2011

(54) MOTORCYCLES HAVING FRAME WITH APERTURE PASSING FLEXIBLE DRIVE MEMBER AND METHODS

(75) Inventors: Daisuke Nagao, Long Beach, CA (US); Kenji Tamura, Redondo Beach, CA (US)

(73) Assignee: Honda Motor Company, Ltd., Tokyo (JP)

( * ) Notice: Subject to any disclaimer, the term of this patent is extended or adjusted under 35 U.S.C. 154(b) by 452 days.

(21) Appl. No.: 12/254,879

(22) Filed: Oct. 21, 2008

(65) Prior Publication Data

US 2010/0096205 A1 Apr. 22, 2010

(51) Int. Cl.
*B62D 61/02* (2006.01)
(52) U.S. Cl. ........................ 180/219; 180/231
(58) Field of Classification Search .................. 180/219, 180/231; 280/261
See application file for complete search history.

(56) References Cited

U.S. PATENT DOCUMENTS

| | | | |
|---|---|---|---|
| 3,012,632 A | 12/1961 | Bradley | |
| 3,517,764 A * | 6/1970 | Wendt | 180/227 |
| 3,720,289 A | 3/1973 | Moldenhauer | |
| 4,616,729 A | 10/1986 | Kasai | |
| 4,660,854 A | 4/1987 | Suzuki et al. | |
| 4,691,800 A | 9/1987 | Kadono et al. | |
| 4,696,363 A | 9/1987 | Enda | |
| 4,887,687 A | 12/1989 | Asai et al. | |
| 5,221,236 A * | 6/1993 | Raymer et al. | 474/109 |
| 5,353,888 A | 10/1994 | Tsukahara | |
| 5,375,677 A | 12/1994 | Yamagiwa et al. | |
| 5,996,718 A | 12/1999 | Desrosiers | |
| 6,105,700 A | 8/2000 | Williams et al. | |
| 6,371,236 B1 | 4/2002 | Fukunaga | |
| 6,575,260 B2 | 6/2003 | Bourget | |
| 6,585,072 B2 | 7/2003 | Scherbarth | |
| 6,609,585 B2 | 8/2003 | Buell et al. | |
| 6,695,089 B2 | 2/2004 | Adachi et al. | |
| 6,866,112 B2 | 3/2005 | Hoechst et al. | |
| 7,017,698 B2 | 3/2006 | Bryan | |
| 7,097,190 B2 | 8/2006 | Matsumoto et al. | |
| 2002/0043416 A1 * | 4/2002 | Hoechst et al. | 180/231 |
| 2003/0164257 A1 | 9/2003 | Soileau | |
| 2005/0139407 A1 | 6/2005 | Czysz | |
| 2005/0206122 A1 | 9/2005 | Ichihara et al. | |
| 2005/0212351 A1 | 9/2005 | McKay | |
| 2006/0137928 A1 | 6/2006 | Parker | |
| 2006/0197304 A1 | 9/2006 | Ishikawa et al. | |
| 2009/0058038 A1 * | 3/2009 | Dodman et al. | 280/274 |
| 2009/0107754 A1 * | 4/2009 | Doperalski et al. | 180/337 |

* cited by examiner

*Primary Examiner* — Kevin Hurley
(74) *Attorney, Agent, or Firm* — Ulmer & Berne LLP

(57) ABSTRACT

A motorcycle includes a frame and a flexible drive member. The frame is provided with an aperture. An engine is attached to the frame and is configured to selectively rotate a drive sprocket. A driven sprocket is attached to a rear wheel. A flexible drive member operably couples the drive sprocket and the driven sprocket and, in doing so, passes through the aperture in the frame. Methods of manufacturing a motorcycle are also provided.

20 Claims, 5 Drawing Sheets

MOTORCYCLES HAVING FRAME WITH APERTURE PASSING FLEXIBLE DRIVE MEMBER AND METHODS

TECHNICAL FIELD

A motorcycle includes a frame and a flexible drive member. The flexible drive member operably couples a drive sprocket and a driven sprocket and passes through an aperture in the frame.

BACKGROUND

Conventional motorcycles often include a flexible drive member which operably couples a driven sprocket on a rear wheel with, a drive sprocket associated with an engine. The flexible drive member commonly comprises a chain or a belt. In routing die flexible drive member to avoid undesired contact with other components of the motorcycle, disposition of the flexible drive member can contribute to an increased overall width of the motorcycle. In addition, guards might be provided to prevent inadvertent contact of the flexible drive member with the leg or other body part of an operator. Such guards can additively contribute to an increased overall width of the motorcycle, and can additionally be heavy, bulky, prone to rattling, difficult to install, difficult to clean, and aesthetically unattractive.

SUMMARY

In accordance with one embodiment, a motorcycle comprises a frame, a drive sprocket, an engine, a swingarm, a rear wheel, a driven sprocket, and a flexible drive member. The frame extends from a forward end to a rearward end. The frame is provided with a first aperture adjacent to the rearward end. The engine is attached to the frame and is configured to selectively rotate the drive sprocket. The swingarm is pivotally attached to the frame adjacent to the rearward end of the frame. The rear wheel is rotatably attached to the swingarm. The driven sprocket is attached to the rear wheel. The flexible drive member operably couples the drive sprocket and the driven sprocket. The flexible drive member passes through the first aperture in the frame.

In accordance with another embodiment, a motorcycle comprises a frame, a drive sprocket, an engine, a swingarm, and a flexible drive member. The frame extends from a forward end to a rearward end and comprises a left main frame member and a right main frame member. The left main frame member and the right main frame member each extend obliquely downwardly and rearwardly from the forward end to the rearward end. The forward end of the frame comprises a steering interface and the rearward end of the frame comprises a swingarm interface. One of the left main frame member and the right main frame member is provided with a first aperture adjacent to the rearward end. The engine is attached to the frame at a location at least partially between the left main frame member and the right main frame member. The engine is configured to selectively rotate the drive sprocket. The swingarm is attached to the swingarm interface and supports a rear wheel. A driven sprocket is attached to the rear wheel. The flexible drive member operably couples the drive sprocket and the driven sprocket. The flexible drive member passes through the first aperture.

In accordance with yet another embodiment, a method of manufacturing a motorcycle is provided. The method comprises providing a frame extending from a forward end to a rearward end. A first aperture is formed in the frame adjacent to the rearward end. An engine is attached to the frame. The engine is configured to selectively rotate a drive sprocket. A swingarm is pivotally attached to the frame adjacent to the rearward end of the frame. A rear wheel is rotatably attached to the swingarm. A drive sprocket is attached to the rear wheel. A flexible drive member is routed over the drive sprocket, through the first aperture in the frame, and over the driven sprocket.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
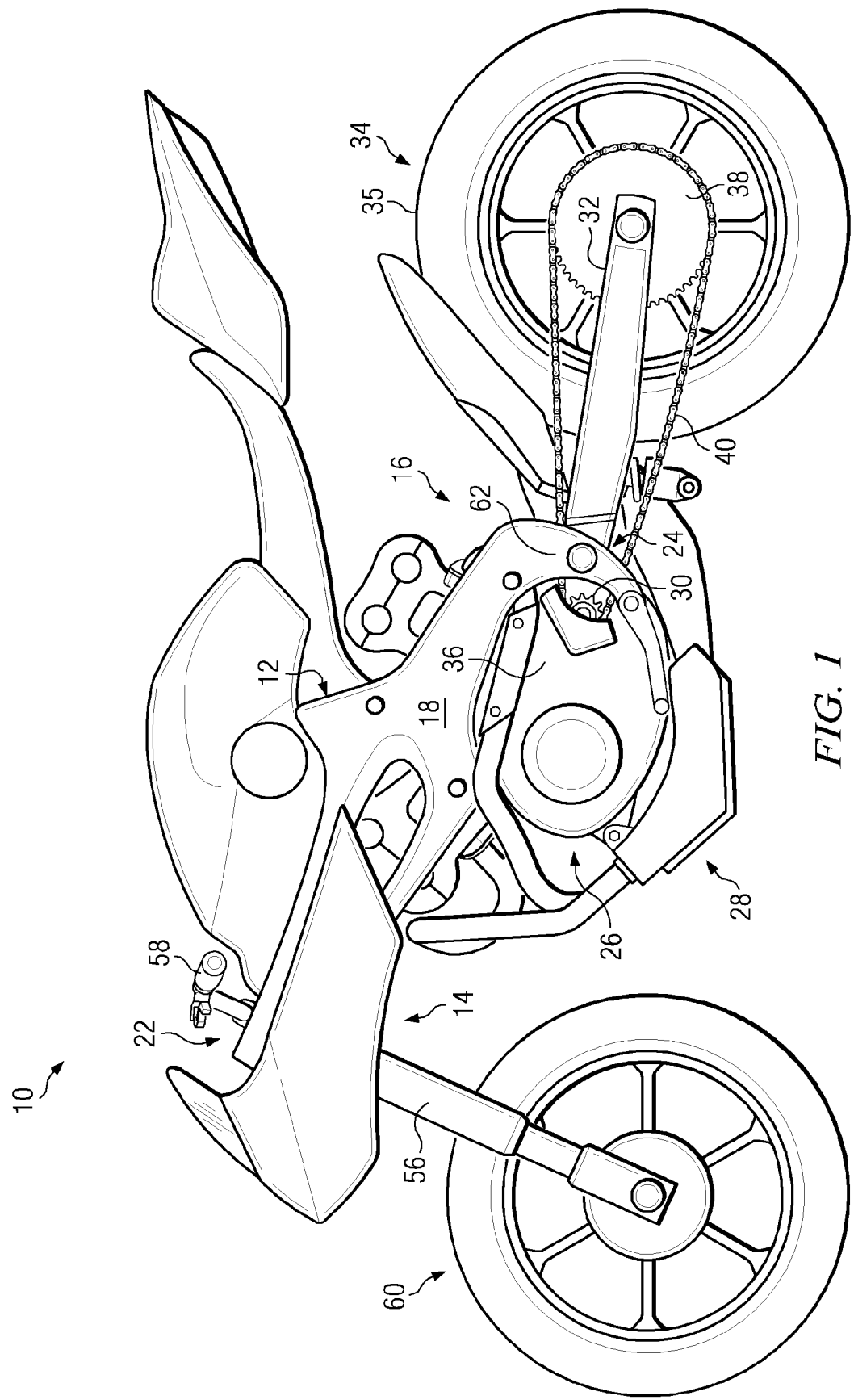
FIG. 1 is a left side elevational view depicting a motorcycle in accordance with one embodiment.
Figure 2:
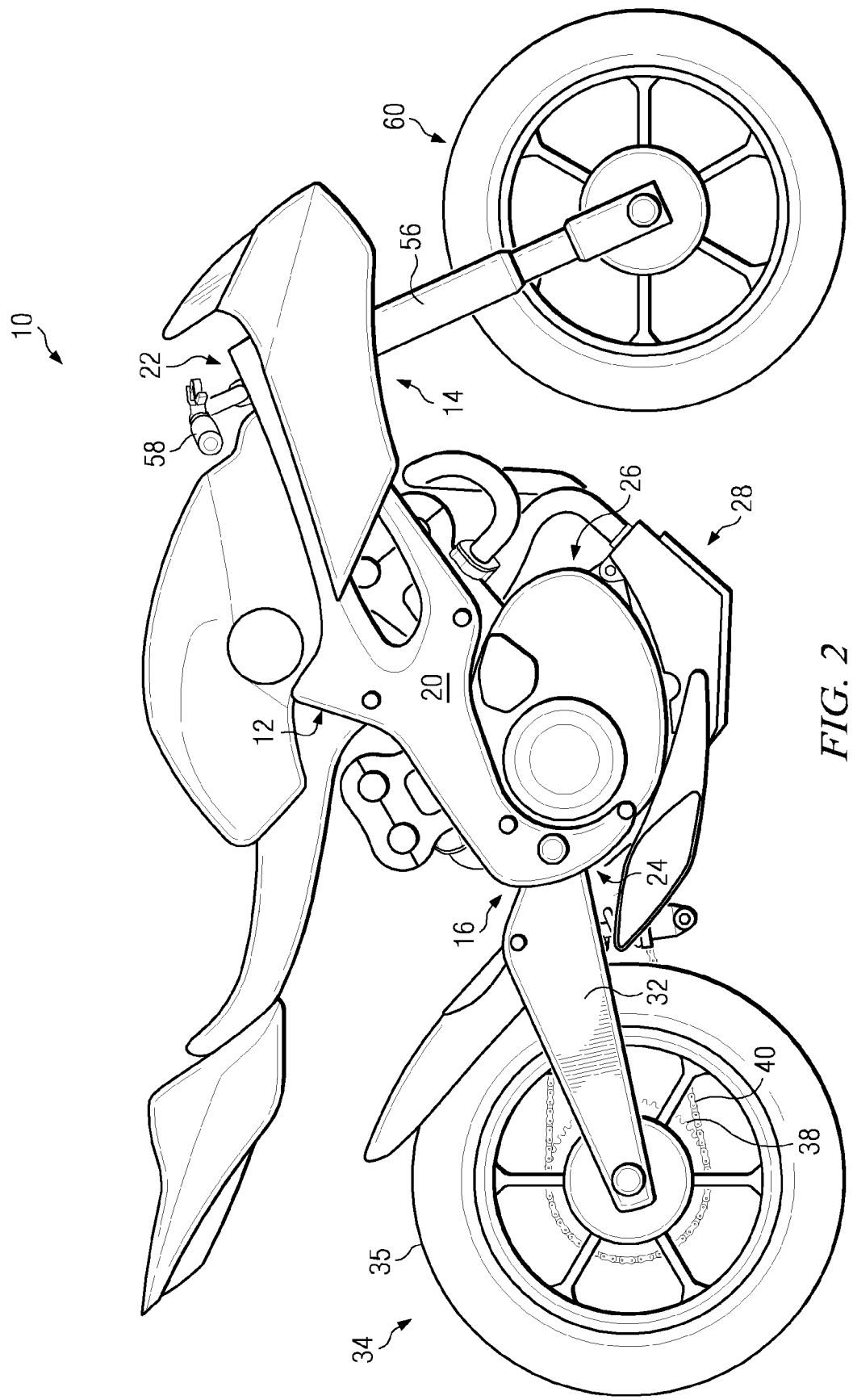
FIG. 2 is a right side elevational view depicting the motorcycle of FIG. 1.
Figure 3:
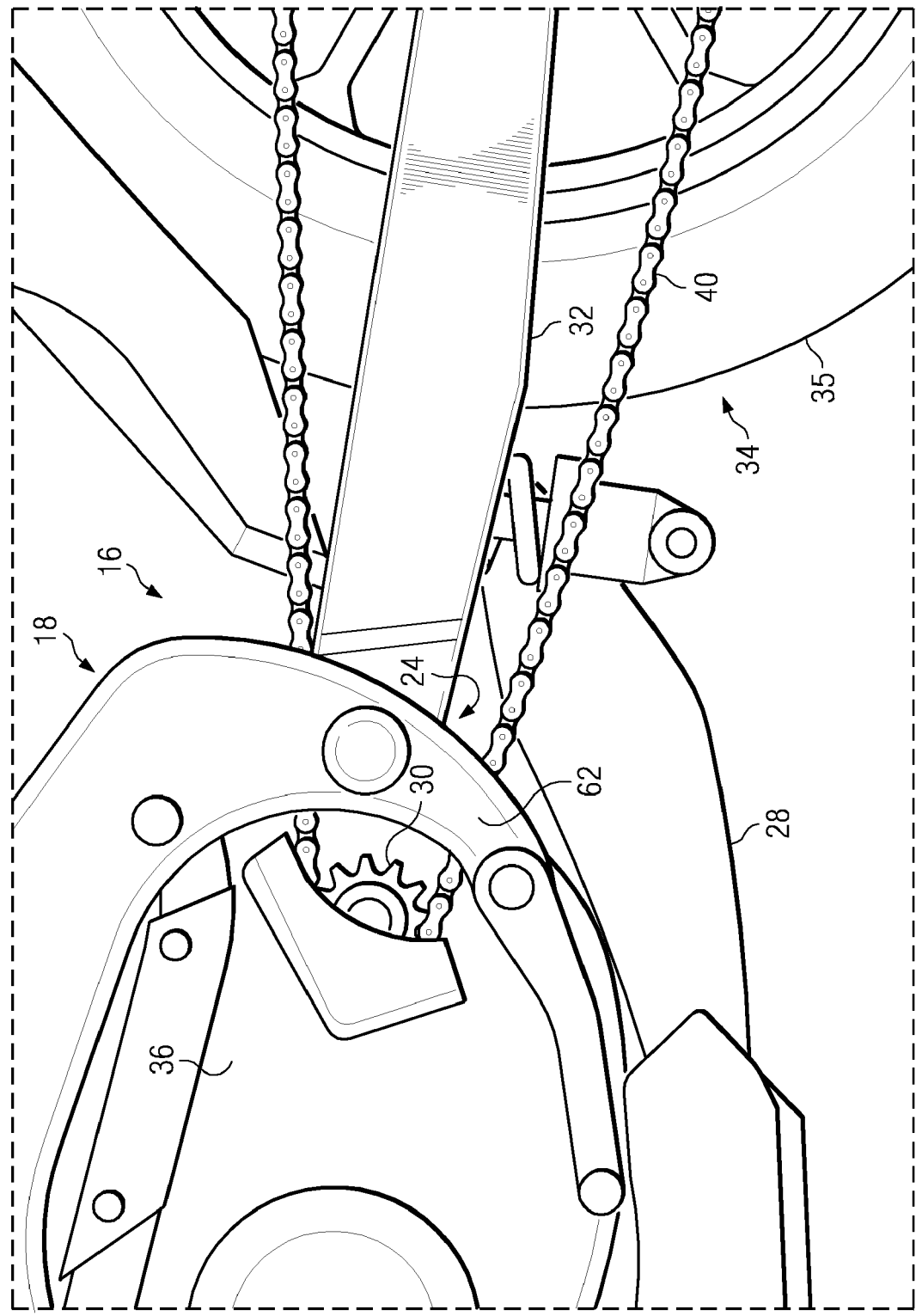
FIG. 3 is an enlarged left side elevational view depicting a portion of the motorcycle of FIG. 1.
Figure 4:
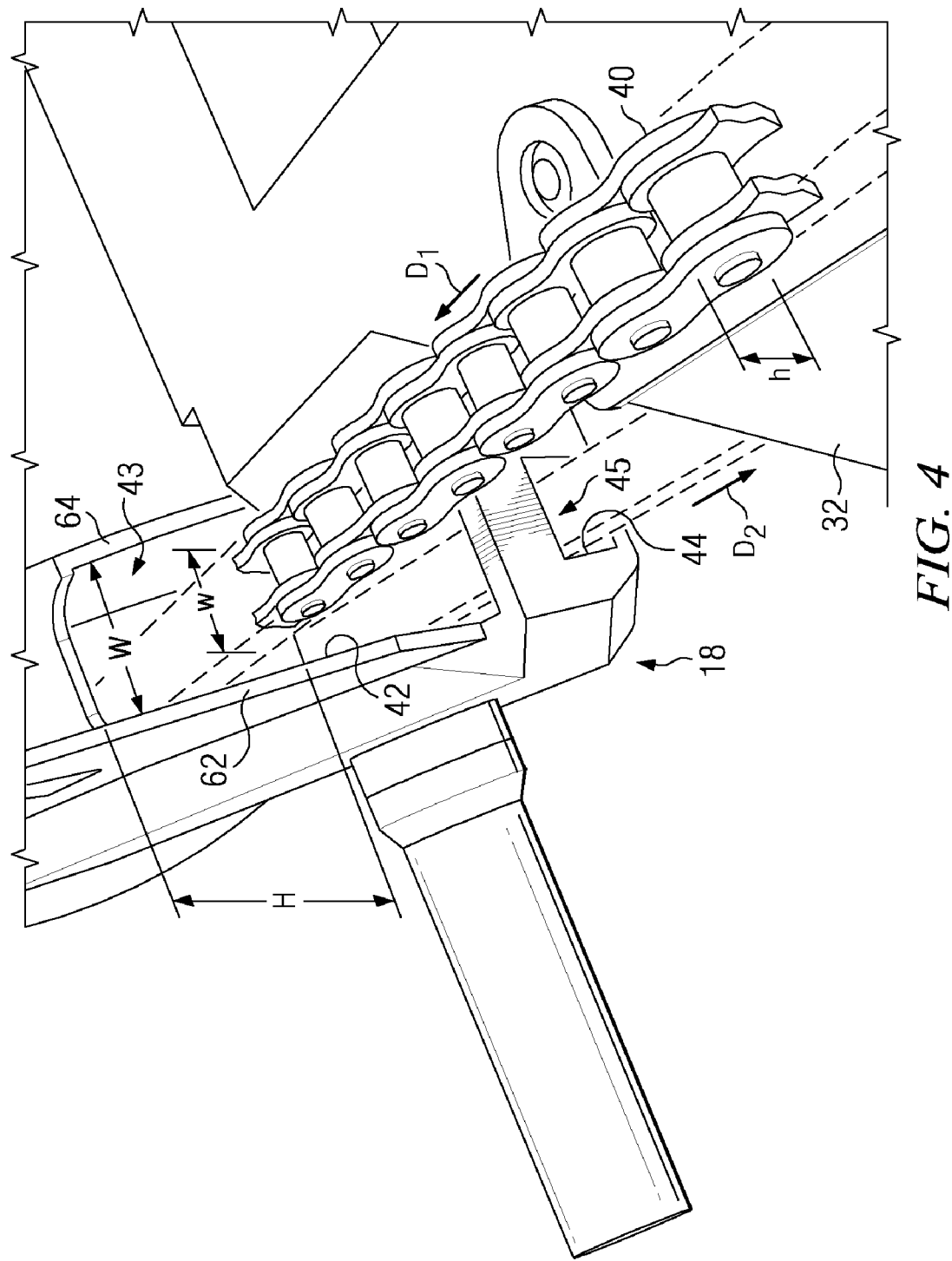
FIG. 4 is a left rear perspective view depicting a portion of the motorcycle of FIG. 1, wherein a portion of the chain is shown in dashed lines for clarity of illustration.

Embodiments are hereinafter described in detail in connection with the views of FIGS. 1-5, wherein like numbers indicate the same or corresponding elements throughout the views. In accordance with one embodiment, a motorcycle can be provided with a frame having an aperture configured for passage of a flexible drive member. For example, as shown in the example of FIGS. 1-5, a motorcycle 10 is shown to comprise a frame 12 which extends from a forward end 14 to a rearward end 16. As shown in FIGS. 1, 2 and 4, the frame 12 can include a left main frame member 18 and a right main frame member 20. The left main frame member 18 and the right main frame member 20 can each extend obliquely downwardly and rearwardly from the forward end 14 of the frame 12 to the rearward end 16 of the frame 12. The forward end 14 of the frame 12 can comprise a steering interface 22 and the rearward end 16 of the frame 12 can comprise a swingarm interface 24.

The left and right main frame members 18 and 20 can be spaced from one another along at least part of their extension. However, the left and right main frame members 18 and 20 can connect with and/or contact one another at one or more locations, such as near the forward end 14 at the steering interface 22 and/or near the rearward end 16 at the swingarm interface 24. In one particular embodiment, as also shown in FIGS. 1-5, the left and right main frame members 18 and 20 can be spaced from each other in a generally corresponding and mirroring relationship with respect to, and on opposite sides of, an imaginary vertical plane which bisects the motorcycle 10 along a longitudinal axis of the motorcycle 10 into left and right sides. However, it will be appreciated that a motorcycle in accordance with an alternative embodiment might include any of a variety of alternative frame configurations.

The motorcycle 10 is also shown to include a front fork 56. The front fork 56 is shown to be pivotally attached to the steering interface 22 such that an operator may facilitate steering of the motorcycle 10 through use of a handlebar 58 attached to the front fork 56. A front wheel 60 can be supported with respect to the frame 12 adjacent to the forward end 14 of the frame 12 such as by rotatably attaching the front wheel 60 to the front fork 56. The motorcycle 10 is also shown to include a swingarm 32 which is pivotally attached to the swingarm interface 24 of the frame 12. A rear wheel 34 can be supported with respect to the frame 12 adjacent to the rearward end 16 of the frame 12 such as by rotatably attaching the rear wheel 34 to the swingarm 32, as shown in FIGS. 1-5. The swingarm 32 can be configured to support the rear wheel 34.

The motorcycle 10 is also shown to comprise an engine 26 which is attached to the frame 12. In one embodiment, as shown in FIGS. 1-5, the engine 26 may be attached to the frame 12 at a location at least partially between the left main frame member 18 and the right main frame member 20. In another embodiment, as also shown in FIG. 1, the engine 26 may be attached to the frame 12 at a location between the forward end 14 of the frame 12 and the rearward end 16 of the frame 12. The left and right main frame members 18 and 20 can be attached to left and right sides of the engine 26 such that the engine 26 hangs downwardly from the frame 12. As also shown in the embodiment of FIGS. 1-5, the motorcycle 10 can be configured such that no portion of the frame 12 extends beneath the engine 26 such as to cradle or protect the engine 26. However, in this configuration, a muffler 28 can be attached to the engine 26 at a location beneath the engine 26 for protecting the bottom of the engine 26 from damage such as from road debris. It will be appreciated that an engine might alternatively be attached or otherwise supported with respect to the frame of a motorcycle in any of a variety of alternative configurations.

The engine 26 may comprise an internal combustion engine such as a V-type engine, as shown in FIG. 1. However, it will be appreciated that a motorcycle in accordance with an alternative embodiment might comprise a different type of internal combustion engine. An internal combustion engine can be configured to consume gasoline, diesel fuel, kerosene, natural gas, propane, alcohol, jet fuel, hydrogen, and/or any of a variety of other fuels. In still another embodiment, a motorcycle might be provided with an electric or hybrid drive system in which the engine comprises an electric motor.

The motorcycle 10 can also include a drive sprocket 30 which is operatively coupled with the engine 26. In one embodiment, this operative coupling can involve direct or indirect attachment of the drive sprocket 30 to a transmission or gearbox (e.g., 36) which is directly or indirectly attached to the crankshaft of the engine 26. As such, the engine 26 can be configured to selectively rotate the drive sprocket 30. A driven sprocket 38 can be attached to the rear wheel 34 to rotate correspondingly with the rear wheel 34, as shown in FIGS. 1-5. In one embodiment, the driven sprocket 38 can be bolted to the hub of the rear wheel 34. However, it will be appreciated that the driven sprocket 38 may be attached or supported with respect to the rear wheel 34 in any of a variety of alternative configurations.

The motorcycle 10 further comprises a flexible drive member which is configured to operably couple the drive sprocket 30 and the driven sprocket 38. In one embodiment, as shown in FIGS. 1-5, the flexible drive member comprises a chain 40. In such circumstance wherein the flexible drive member comprises a chain 40, it will be appreciated that each of the drive sprocket 30 and the driven sprocket 38 can comprise teeth for drivingly engaging the chain 40. However, in an alternative embodiment, the flexible drive member might comprise a belt such as, for example, a v-type belt or a cogged belt. In such circumstance wherein the flexible drive member comprises a belt, it will be appreciated that the drive sprocket and the driven sprocket can comprise respective pulleys which are configured to drivingly engage the belt.

In one embodiment, the frame of a motorcycle comprises at least one aperture which is configured to pass the flexible drive member as it travels between the drive sprocket and the driven sprocket. In one embodiment, the aperture(s) can be provided in the frame adjacent to a rearward end of the frame. For example, in the embodiment of FIGS. 1-5, the left main frame member 18 is shown to be provided with first and second apertures 42 and 44 which are each positioned adjacent to the rearward end 16 of the frame 12. In one embodiment, as shown in FIG. 4, the second aperture 44 is spaced from, and thus separated from, the first aperture 42. The chain 40 is shown in FIG. 4 to pass through the first aperture 42 in a first direction $D_1$, while the chain 40 is shown to pass through the second aperture 44 in a second direction $D_2$, such as may be encountered when the motorcycle 10 moves along the ground in a forward direction. The first direction $D_1$ is shown in FIG. 4 as being substantially opposite from the second direction $D_2$. It will be appreciated that, when the motorcycle 10 moves along the ground in a reverse direction, the directions in which the chain 40 travels through the first and second apertures 42 and 44 can be reversed as compared to those shown in FIG. 4.

While the embodiment of FIG. 4 depicts the chain 40 passing through two respective apertures (i.e., 42, 44) in the frame 12, it will be appreciated that an alternative embodiment might involve a flexible drive member passing through only a single aperture in the frame of a motorcycle. In passing through this single aperture, the flexible drive member might pass only once (i.e., in one direction), or can alternatively pass twice (e.g., in substantially opposite directions). It will be appreciated that a motorcycle frame can include one or more apertures which are configured to pass a flexible drive member in any of a variety of alternative configurations in accordance with other embodiments.

Referring again to FIG. 4, each of the first and second apertures 42 and 44 are shown to define respective passages 43 and 45 for passing the chain 40. In particular, the left main frame member 18 is shown to comprise an outer wall 62 and an inner wall 64, both of which are shown to partially define each of the first and second apertures 42 and 44. The outer wall 62 can be positioned to prevent contact by an operator's left foot and/or leg with the portion of the chain 40 passing through the first and second apertures 42 and 44. Likewise, the inner wall 64 can be positioned to prevent that portion of the chain 40 from inadvertently contacting the operator and/or other components of the motorcycle 10. In this manner, the frame 12 can be configured to provide a guard for the chain 40. In particular, by passing the chain 40 through an interior passageway (e.g., passages 43 and 45) of the frame 12, the frame 12 can protect the operator of the motorcycle 10 from contacting this portion of the chain 40, and can thereby serve as a chain guard. While a chain guard type passage might additionally be provided in the swingarm 32, it will be appreciated that, by providing a chain guard type passage (e.g., 43 and 45) in the frame 12, as shown in FIGS. 1-5, the point of most likely contact of the chain 40 with the foot and/or leg of an operator of the motorcycle 10 can best be covered, and without requiring the provision of bulky bolt-on chain guards or the like which can increase the overall width of the motorcycle 10.

Figure 5:
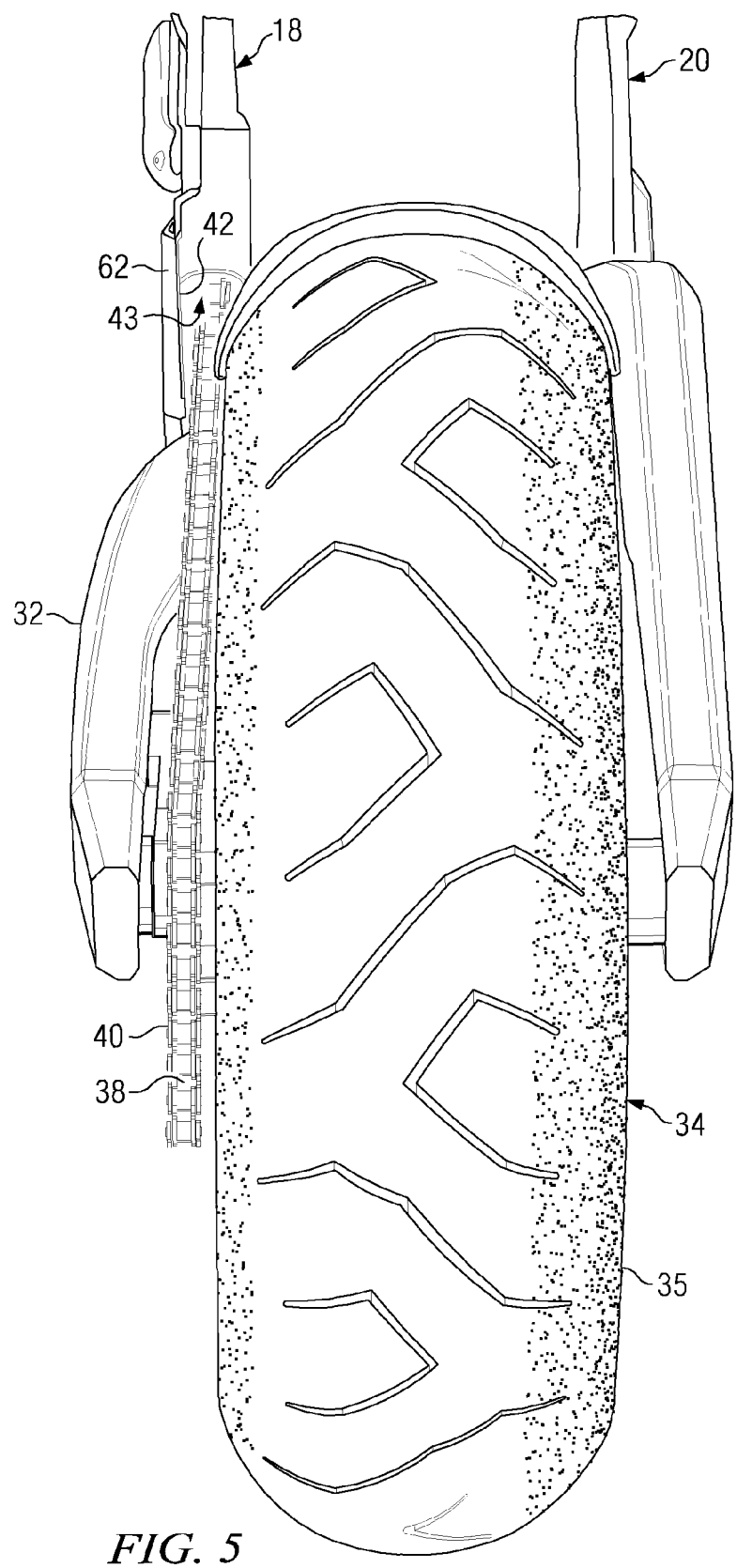
FIG. 5 is a rear perspective view depicting a portion of the motorcycle of FIG. 1.

By facilitating passage of the chain 40 through apertures (e.g., 42 and 44) in the frame 12, it will be appreciated that the motorcycle 10 can accommodate use of a relatively wide tire 35 upon the rear wheel 34, but while still having a relatively narrow overall body width as shown, for example, in the embodiment of FIG. 5. Also, by facilitating passage of the chain 40 through apertures (e.g., 42 and 44) in the frame 12, it will be appreciated that the width of the frame 12 adjacent to its attachment to the swingarm 32 need not be narrowed to accommodate passage of the chain 40. Accordingly, by allowing the frame 12 to maintain its full width (which can be slightly greater than the combined width of the tire 35 and the chain 40, as shown in FIG. 5) at its point of attachment with the swingarm 32, it will be appreciated that the motorcycle 10 can exhibit increased rigidity as compared with conventional motorcycles.

The first and second apertures 42 and 44 are each shown in FIG. 4 to be elongated to accommodate movement of the chain with respect to the frame 12 resulting from pivotal movement of the swingarm 32 with respect to the frame 12 as would be encountered during suspension travel occurring through use of the motorcycle 10. For example, as shown in FIG. 4, the first aperture 42 is shown to be vertically elongated, meaning that the height of the opening (shown as "H" in FIG. 4) is substantially greater than the height of the chain 40 (shown as "h" in FIG. 4). In this configuration, though the swingarm 32 can move with respect to the frame 12, thereby causing the relative position of the chain 40 to vary with respect to the frame 12, the top and bottom surfaces of the chain 40 generally will not contact the frame 12 adjacent to the first aperture 42 during normal operation of the motorcycle 10. Likewise, the first aperture 42 is shown to be horizontally elongated, meaning that the width of the opening (shown as "W" in FIG. 4) is substantially greater than the width of the chain 40 (shown as "w" in FIG. 4). In this configuration, despite any side-to-side movement of the chain 40 which may occur during normal operation of the motorcycle 10 (e.g., due to vibration), the side surfaces of the chain 40 generally will not contact the frame 12 adjacent to the first aperture 42. It will be appreciated that the second aperture 44 can similarly be vertically and horizontally elongated.

While the chain 40 is shown in FIGS. 1-5 as being oriented upon the left side of the motorcycle 10, it will be appreciated that a motorcycle in accordance with an alternative embodiment can additionally or alternatively include a flexible drive member oriented upon the right side of the motorcycle. It will also be appreciated that a motorcycle having a flexible drive member disposed upon the right side of the motorcycle might include one or more apertures in the frame (e.g., the right main frame member 20) which are configured to pass the flexible drive member.

The apertures (e.g., 42 and 44) can be formed in the frame through use of any of a variety of suitable techniques. For example, the apertures can be drilled, milled, stamped, cut, or otherwise machined or provided. In still another embodiment, a frame for a motorcycle can be formed in a casting process to include apertures for passing a flexible drive member. When assembling a motorcycle including such a frame, such as the motorcycle 10 of FIGS. 1-5, the engine 26 can be attached to the frame 12. The swingarm 32 can be pivotally attached to the frame 12 adjacent to the rearward end 18 of the frame 12. The rear wheel 34 can be rotatably attached to the swingarm 32. The driven sprocket 38 can be attached to the rear wheel 34. A flexible drive member (e.g., the chain 40) can then be routed over the drive sprocket 38, through the first aperture 42 in the frame 12, through the second aperture 44 in the frame 12, and over the driven sprocket 38.

In such circumstance wherein the flexible drive member comprises a chain 40, as in FIGS. 1-5, it will be appreciated that the chain 40 can be selectively breakable such as through use of a master link. Prior to routing the chain 40 through the first and second apertures 42 and 44 in the frame 12, the master link of the chain can be opened such that one end of the chain 40 can be routed as described above. Once the chain 40 is fully routed, both ends of the chain 40 can be brought together and attached through use of the master link such that the chain 40 comprises a continuous loop. In such circumstance wherein the flexible drive member comprises a belt, it will be appreciated that the belt might be selectively breakable. However, in an alternative embodiment, a non-breakable continuous belt may be employed in accordance with selected embodiments provided that, however, the apertures in the frame include access slots to facilitate installation and removal of the belt as a continuous loop.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A motorcycle comprising:
   a frame extending from a forward end to a rearward end, wherein the frame is provided with a first aperture and a second aperture, the first aperture and the second aperture are each adjacent to the rearward end of the frame, and the second aperture is spaced from the first aperture;
   a drive sprocket;
   an engine attached to the frame and configured to selectively rotate the drive sprocket;
   a swingarm pivotally attached to the frame adjacent to the rearward end of the frame;
   a rear wheel rotatably attached to the swingarm;
   a driven sprocket attached to the rear wheel; and
   a flexible drive member operably coupling the drive sprocket and the driven sprocket, wherein the flexible drive member passes in a first direction through the first aperture in the frame, the flexible drive member passes in a second direction through the second aperture in the frame, and the first direction is substantially opposite from the second direction.

2. The motorcycle of claim 1 wherein the flexible drive member comprises a chain.

3. The motorcycle of claim 2 wherein the frame is configured to provide a guard for the chain.

4. The motorcycle of claim 1 wherein the first aperture is elongated to accommodate movement of the flexible drive member with respect to the frame resulting from pivotal movement of the swingarm with respect to the frame.

5. The motorcycle of claim 4 wherein the second aperture is elongated to accommodate movement of the flexible drive member with respect to the frame resulting from pivotal movement of the swingarm with respect to the frame.

6. The motorcycle of claim 1 wherein the engine comprises an internal combustion engine.

7. A motorcycle comprising:
   a frame extending from a forward end to a rearward end and comprising a left main frame member and a right main frame member, wherein the left main frame member and the right main frame member each extend obliquely downwardly and rearwardly from the forward end to the rearward end, and wherein the forward end of the frame comprises a steering interface and the rearward end of the frame comprises a swingarm interface, and one of the left main frame member and the right main frame member is provided with a first aperture adjacent to the rearward end;

a drive sprocket;

an engine attached to the frame at a location at least partially between the left main frame member and the right main frame member, wherein the engine is configured to selectively rotate the drive sprocket;

a swingarm attached to the swingarm interface and supporting a rear wheel, wherein a driven sprocket is attached to the rear wheel; and a flexible drive member operably coupling the drive sprocket and the driven sprocket, wherein the flexible drive member passes through the first aperture.

8. The motorcycle of claim 7 wherein the flexible drive member comprises a chain.

9. The motorcycle of claim 8 wherein the frame is configured to provide a guard for the chain.

10. The motorcycle of claim 7 wherein the first aperture is elongated to accommodate movement of the flexible drive member with respect to the frame resulting from pivotal movement of the swingarm with respect to the frame.

11. The motorcycle of claim 7 wherein the one of the left main frame member and the right main frame member is provided with a second aperture adjacent to the rearward end of the frame, the second aperture is spaced from the first aperture, the flexible drive member passes through the first aperture in a first direction, the flexible drive member passes through the second aperture in a second direction, and the first direction is substantially opposite from the second direction.

12. The motorcycle of claim 11 wherein the second aperture is elongated to accommodate movement of the flexible drive member with respect to the frame resulting from pivotal movement of the swingarm with respect to the frame.

13. The motorcycle of claim 7 wherein the engine comprises an internal combustion engine.

14. A method of manufacturing a motorcycle, the method comprising:
providing a frame extending from a forward end to a rearward end;
forming a first aperture in the frame adjacent to the rearward end;
forming a second aperture in the frame adjacent to the rearward end at a location spaced from the first aperture;
attaching an engine to the frame, wherein the engine is configured to selectively rotate a drive sprocket;
pivotally attaching a swingarm to the frame adjacent to the rearward end of the frame;
rotatably attaching a rear wheel to the swingarm;
attaching a drive sprocket to the rear wheel; and
routing a flexible drive member over the drive sprocket, through the first aperture in the frame, through the second aperture in the frame, and over the driven sprocket.

15. The method of claim 14 wherein the first aperture is formed by drilling.

16. The method of claim 14 wherein the first aperture is formed by machining.

17. The motorcycle of claim 4 wherein the flexible drive member comprises a chain.

18. The motorcycle of claim 5 wherein the flexible drive member comprises a chain.

19. The motorcycle of claim 10 wherein the flexible drive member comprises a chain.

20. The motorcycle of claim 12 wherein the flexible drive member comprises a chain.

* * * * *

UNITED STATES PATENT AND TRADEMARK OFFICE
CERTIFICATE OF CORRECTION

| | | |
|---|---|---|
| PATENT NO. | : 7,980,347 B2 | Page 1 of 1 |
| APPLICATION NO. | : 12/254879 | |
| DATED | : July 19, 2011 | |
| INVENTOR(S) | : Daisuke Nagao et al. | |

It is certified that error appears in the above-identified patent and that said Letters Patent is hereby corrected as shown below:

IN THE SPECIFICATIONS:

Column 1, line 16, change "with," to -- with --;
Column 1, line 18, change "die" to -- the --; and
Column 5, line 24, change "lop" to -- top --.

Signed and Sealed this
Thirteenth Day of September, 2011

David J. Kappos
*Director of the United States Patent and Trademark Office*